Patented Aug. 21, 1928.

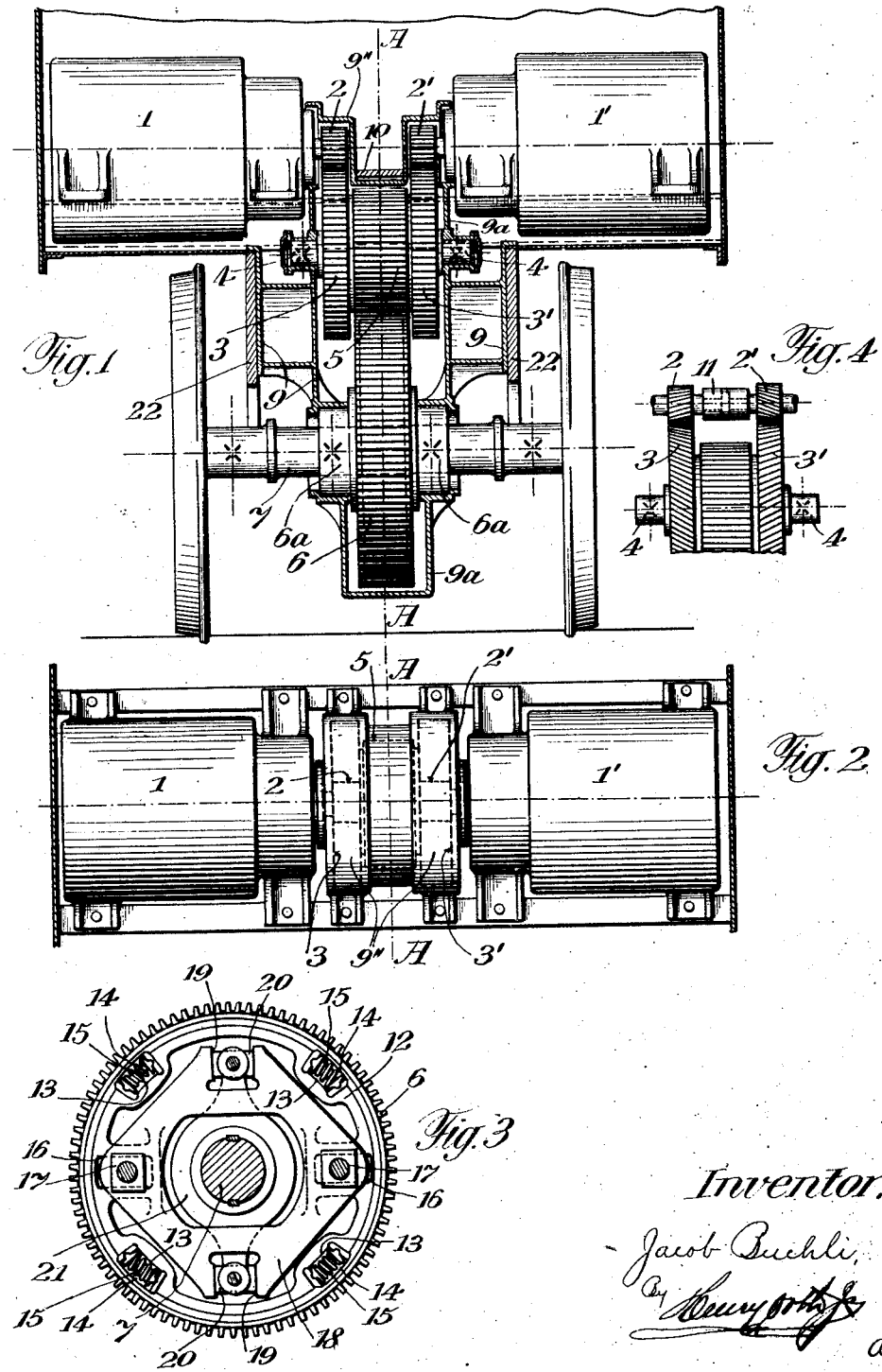

1,681,171

UNITED STATES PATENT OFFICE.

JACOB BUCHLI, OF WINTERTHUR, SWITZERLAND.

DRIVING GEAR FOR ELECTRICALLY-DRIVEN LOCOMOTIVES.

Application filed February 24, 1927, Serial No. 170,699, and in Germany July 12, 1926.

The present invention refers to improvements in the driving gear for electrically driven locomotives.

Driving arrangements for electrically driven locomotives having motors placed at a high level are known in which in the distance between the motor shaft and the driving axle of the locomotive there is provided an intermediate gear wheel between the pinion of the motor shaft and the gear wheel arranged on the driving wheel axle. This intermediate gear wheel works under very disadvantageous conditions, particularly where large turning moments have to be transmitted with gear wheels running with high circumferential speeds. The transmission of large turning moments requires an adequate dimensioning of the teeth of the gear wheels so that they respond to the requirements. Teeth of large pitch cause a noise which is undesirable in the drive of locomotives and this noise is the greater the higher the circumferential speed of the gear wheels has to be. The ratio of the gearing is determined by the diameter of the driving wheels and by the clearance gauge, i. e. the profile defining the maximum fixed structure.

With the above mentioned arrangement the intermediate or countershaft wheel co-operates with two gear wheels having different diameters. This arrangement has the drawback that the wear of the teeth of the intermediate gear wheel is far greater than the wear of the teeth of the other gear wheels with which the intermediate wheel co-operates and it is caused by the two-fold contact and by the difference in the diameters of the wheels. The gear wheel driving the intermediate gear wheel and that driven by the latter impress two working surfaces on the teeth of the intermediate gear wheel whereby a great noise and an abnormal wear of this wheel are caused. With this construction which has been working for a considerable time an extraordinary raised burr is caused on the flanks of the teeth. This burr is caused by one gear wheel co-operating only with the points and the other only with the root of the teeth of the intermediate gear wheel.

A transmission gearing having an intermediate wheel of this type is thus not suitable for gear wheels running at high speeds. These disadvantages are overcome by the double or two speed reduction transmission gearing according to the present invention.

With known constructions the motors working on the intermediate gear wheel are staggered against each other and with respect to the longitudinal axis of the vehicle for the purpose of making use of the total width of the teeth of the intermediate gear wheel for every pinion.

The subject matter of the present invention overcomes all the above mentioned drawbacks and presents moreover a number of further advantages.

The invention consists in a driving gear for electrically driven locomotives in which power is transmitted from electric motors to the driving wheels by means of two speed reduction gearings and a sleeve surrounding the driving wheel axle, some of the parts of the gear being rigidly connected to the locomotive frame and a universally movable coupling being interposed between those parts and the driving wheel axle, which is characterized by the fact that two motors or pairs of motors, arranged opposite each other with respect to the longitudinal direction of the locomotive, transmit their power to one driving wheel axle and that the movable coupling is arranged in a hollow sleeve of the gear wheel which surrounds the driving wheel axle.

The invention also consists in the further feature that for the purpose of obtaining a noiseless running the first reduction gearing is provided with helical teeth and the shafts of the motors are connected to each other by means of a rigid coupling to permit a compensating of the axial thrust generated by the helical teeth. By the arrangement adopted the unspring weight is reduced as much as possible and each wheel has only one contact whereby the wear of the teeth is also reduced to a minimum amount. In contradistinction to a drive having an intermediate wheel, which necessitates a uniform pitch of tooth for all the wheels in the arrangement adopted one is free to choose the pitches for the teeth and every ratio of transmission is rendered possible. The gear wheels of the first transmission gearing which run at a higher speed may be provided with a finer pitch toothing than the gear wheels of the second transmission gearing, whereby a noiseless running is obtained. The gear wheel surrounding the driving axle is provided with a resilient rim. Therefore it is not necessary to construct the pinions on the motor shafts as resilient wheels and it is thus possible to reduce the diameter of these pinions. In case helical teeth are chosen for the first transmission gearing the two motor shafts arranged in alignment are preferably interconnected by a coupling which takes up the axial thrust inherent to the helical teeth.

All the gear wheels are enclosed in a common casing and the teeth as well as the universal coupling may be provided with forced oil lubrication.

A constructional example of the subject matter of the present invention is illustrated on the accompanying drawings, in which:

Fig. 1 shows the driving arrangement in elevation and partly in section,

Fig. 2 is a plan-view of Fig. 1,

Fig. 3 shows the movable coupling arranged inside the gear wheel surrounding the driving wheel axle and Fig. 4 shows a detail modification of the first transmission gearing.

The motors 1, 1' are arranged opposite each other with their shafts at right angles to the longitudinal centre plane A—A of the vehicle. The motor 1 drives by means of the pinion 2 the gear wheel 3 of the countershaft 4 and the motor 1' co-operates by means of the pinion 2' with the gear wheel 3' on the common countershaft 4. Between the gear wheels 3 and 3' the gear wheel 5 is keyed to the countershaft 4 and is in mesh with the gear wheel 6 which is provided with a hollow sleeve or hub $6^a$ surrounding the driving axle 7. Within the sleeve of the gear wheel 6 a universally movable coupling of well known design is provided connecting that wheel to the driving wheel shaft 7. As is shown in Fig. 3 the toothed rim of the gear wheel 6 is resiliently connected with the wheel body 12 on which the hollow sleeve $6^a$ is provided. The toothed rim and the part of the wheel body 12 on which the toothed rim is rotatably mounted being provided with registering recesses 13, 14 in which helical springs 15 are inserted which are compressed when the rim is displaced relatively to the other part of the wheel as disclosed in the U. S. Patent No. 1,412,355 dated April 11th, 1922.

The wheel body 12 is provided with guide slots 16 arranged diametrically opposite each other in which sliding blocks 17 rigidly fixed to the intermediate member 18 of the movable coupling are adapted to slide. The member 18 is provided with guide slots 19 arranged opposite each other and at right angles to the slots 16 and sliding blocks 20 are rigidly fixed to a member 21 keyed to the driving wheel shaft 7 and cooperate with the slots 19.

In the girder 9 which serves to stiffen the locomotive frame 22 and which forms part of the casing $9^a$ for the gear wheels, the countershaft 4 as well as the gear wheels 6 are mounted and are thus supported by the vehicle springs. The upper part $9''$ of the casing is so constructed that between the pinions 2 and 2' a gang-way is provided in which a foot board 10 is arranged.

As is shown in Fig. 4 the pinions 2 and 2' of the first transmission gearing are provided with helical teeth and the shafts of the motors arranged opposite each other are connected by a rigid coupling 11 to take up the axial thrust.

I claim:

1. In an electrically driven locomotive, in combination, a driving wheel axle, two motors arranged opposite each other with respect to the longitudinal direction of the locomotive, two separate reduction gearings interposed between said motors and said driving wheel axle, a main frame for the locomotive to which the electric motors and said reduction gearings are rigidly connected, a hollow shaft surrounding said driving wheel axle, and a movable coupling interposed between said hollow shaft and said driving wheel axle.

2. In an electrically driven locomotive, in combination, a driving wheel axle, two motors arranged opposite each other with respect to the longitudinal direction of the locomotive, a counter-shaft, a first reduction gearing interposed between each motor and said counter-shaft, a second reduction gearing interposed between said countershaft and said driving wheel axle, the body of the large gear wheel of said second reduction gearing comprising a sleeve surrounding said driving wheel axle, a main frame for the locomotive to which the electric motors and said reduction gearings are rigidly connected, and a movable coupling arranged inside said large gear wheel and operatively connected to said sleeve and to said driving wheel axle.

3. In an electrically driven locomotive, in combination, a driving wheel axle, two motors arranged opposite each other with respect to the longitudinal direction of the locomotive, a counter-shaft, a first reduction gearing interposed between each motor and said countershaft, a second reduction gearing interposed between said counter shaft and said driving wheel axle, the large wheel of said second reduction gearing being constructed as a resilient gear wheel and having a hub shaped as a sleeve surrounding said driving wheel axle, a main frame for the locomotive, a further frame carried on said main frame and supporting said electric motors and said reduction gearings, and forming a protective casing for the latter, and a movable coupling arranged inside said large gear wheel and operatively connected to said sleeve and to said driving wheel axle.

4. In an electrically driven locomotive, in combination, a driving wheel axle, two motors arranged opposite each other with respect to the longitudinal direction of the locomotive, a counter shaft, a first reduction gearing interposed between each motor shaft and said counter-shaft and provided with helical teeth, a rigid coupling connecting the adjacent ends of said motor shafts with each other for compensating the axial thrust of said helical teeth, a second reduction gearing interposed between said counter shaft and said driving wheel axle, the body of the large gear wheel of said second reduction gearing comprising a sleeve surrounding said driving wheel axle, a main frame for the locomotive to which the electric motors and said reduction gearings are rigidly connected, and a movable coupling arranged inside said large gear wheel and operatively connected to said sleeve and to said driving wheel axle.

5. In an electrically driven locomotive the combination with the locomotive frame and a driving axle mounted in said frame; of two electric motors arranged on said frame opposite each other transversely of the frame, driving pinions on the motors, a separate wheel meshing with the pinions, a countershaft on which said wheels are mounted, a smaller gear wheel on the shaft and between the first mentioned wheels and rotated in unison therewith, a single large wheel on the axle meshing with said smaller wheel, and a coupling device between said axle and shaft permitting yielding movement of the axle relatively to said large wheel.

In testimony whereof, I have signed my name to this specification.

JACOB BUCHLI.